United States Patent
Shin et al.

(10) Patent No.: US 11,347,320 B1
(45) Date of Patent: May 31, 2022

(54) GESTURE CALIBRATION FOR DEVICES

(71) Applicant: Google LLC, Mountain View, CA (US)

(72) Inventors: Dongeek Shin, Santa Clara, CA (US); David Kim, Zurich (CH); Sofien Bouaziz, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/304,986

(22) Filed: Jun. 29, 2021

(51) Int. Cl.
*G06F 3/01* (2006.01)
*G06F 3/03* (2006.01)

(52) U.S. Cl.
CPC .......... *G06F 3/017* (2013.01); *G06F 3/03* (2013.01); *G06F 2203/0331* (2013.01)

(58) Field of Classification Search
CPC .... G06F 3/017; G06F 3/03; G06F 2203/0331; G06F 1/163; G06F 1/1694
See application file for complete search history.

(56) References Cited

U.S. PATENT DOCUMENTS

| | | | |
|---|---|---|---|
| 10,199,008 B2 * | 2/2019 | Aleem | G06F 3/017 |
| 10,324,494 B2 * | 6/2019 | Camacho Perez | G06F 1/163 |
| 10,348,355 B2 * | 7/2019 | Camacho Perez | G06F 1/163 |
| 2013/0300668 A1 * | 11/2013 | Churikov | G06F 3/041 |
| | | | 345/168 |
| 2018/0184920 A1 | 7/2018 | Rabinovich et al. | |
| 2019/0082800 A1 | 3/2019 | Baranski et al. | |
| 2019/0082985 A1 | 3/2019 | Hong et al. | |
| 2020/0042036 A1 | 2/2020 | Connor | |
| 2020/0371598 A1 * | 11/2020 | Sadarangani | A61B 5/225 |

\* cited by examiner

*Primary Examiner* — Rodney Amadiz
(74) *Attorney, Agent, or Firm* — Brake Hughes Bellermann LLP

(57) ABSTRACT

A computing device, such as a wearable device, may include a gesture sensor that generates a gesture signal in response to a gesture of a user performed while the computing device is being worn or held by the user. A calibration sensor may generate a calibration signal characterizing a degree of tightness with which the computing device is being worn or held by the user. The gesture signal may be calibrated using the calibration signal, to obtain a calibrated gesture signal that is calibrated with respect to the degree of tightness. At least one function of the at least one computing device may be implemented, based on the calibrated gesture signal.

20 Claims, 12 Drawing Sheets

GESTURE CALIBRATION FOR DEVICES

TECHNICAL FIELD

This description relates to device control using gesture-based input.

BACKGROUND

Computing devices, including computers, smartphones, and many types of wearable devices, provide a large number and variety of features and functions to users. These features and functions are associated with corresponding types of human interface components, which enable the users to control the computing device(s) in desired manners. Some devices and associated human interface components provide gesture-based control features.

SUMMARY

According to one general aspect, a computer program product is tangibly embodied on a non-transitory computer-readable storage medium and includes instructions that, when executed by a computing device, are configured to cause the at least one computing device to receive a gesture signal generated by a gesture sensor in response to a gesture of a user performed while the at least one computing device is being worn or held by the user, the gesture sensor being coupled to the at least one computing device. When executed, the instruction may be further configured to cause the at least one computing device to receive a calibration signal generated by a calibration sensor coupled to the at least one computing device, the calibration signal characterizing a degree of tightness with which the at least one computing device is being worn or held by the user, calibrate the gesture signal using the calibration signal, to obtain a calibrated gesture signal that is calibrated with respect to the degree of tightness, and implement at least one function of the at least one computing device, based on the calibrated gesture signal.

According to another general aspect, a computer-implemented method includes receiving a gesture signal generated by a gesture sensor in response to a gesture of a user performed while at least one computing device is being worn or held by the user, the gesture sensor being coupled to the at least one computing device, and receiving a calibration signal generated by a calibration sensor coupled to the at least one computing device, the calibration signal characterizing a degree of tightness with which the computing device is being worn or held by the user. The method may further include calibrating the gesture signal using the calibration signal, to obtain a calibrated gesture signal that is calibrated with respect to the degree of tightness, and implementing at least one function of the at least one computing device, based on the calibrated gesture signal.

According to another general aspect, a computing device includes a processor, a storage medium storing instructions, and a body. A gesture sensor may be coupled to the body and configured to generate a gesture signal generated in response to a gesture of a user performed while the computing device is being worn or held by the user. A calibration sensor may be coupled to the body and configured to generate a calibration signal characterizing a degree of tightness with which the computing device is being worn or held by the user. The instructions, when executed by the processor, may cause the computing device to calibrate the gesture signal using the calibration signal, to obtain a gesture signal that is calibrated with respect to the degree of tightness, and implement at least one function of the at least one computing device, based on the calibrated gesture signal.

The details of one or more implementations are set forth in the accompanying drawings and the description below. Other features will be apparent from the description and drawings, and from the claims.

DETAILED DESCRIPTION

Figure 1:
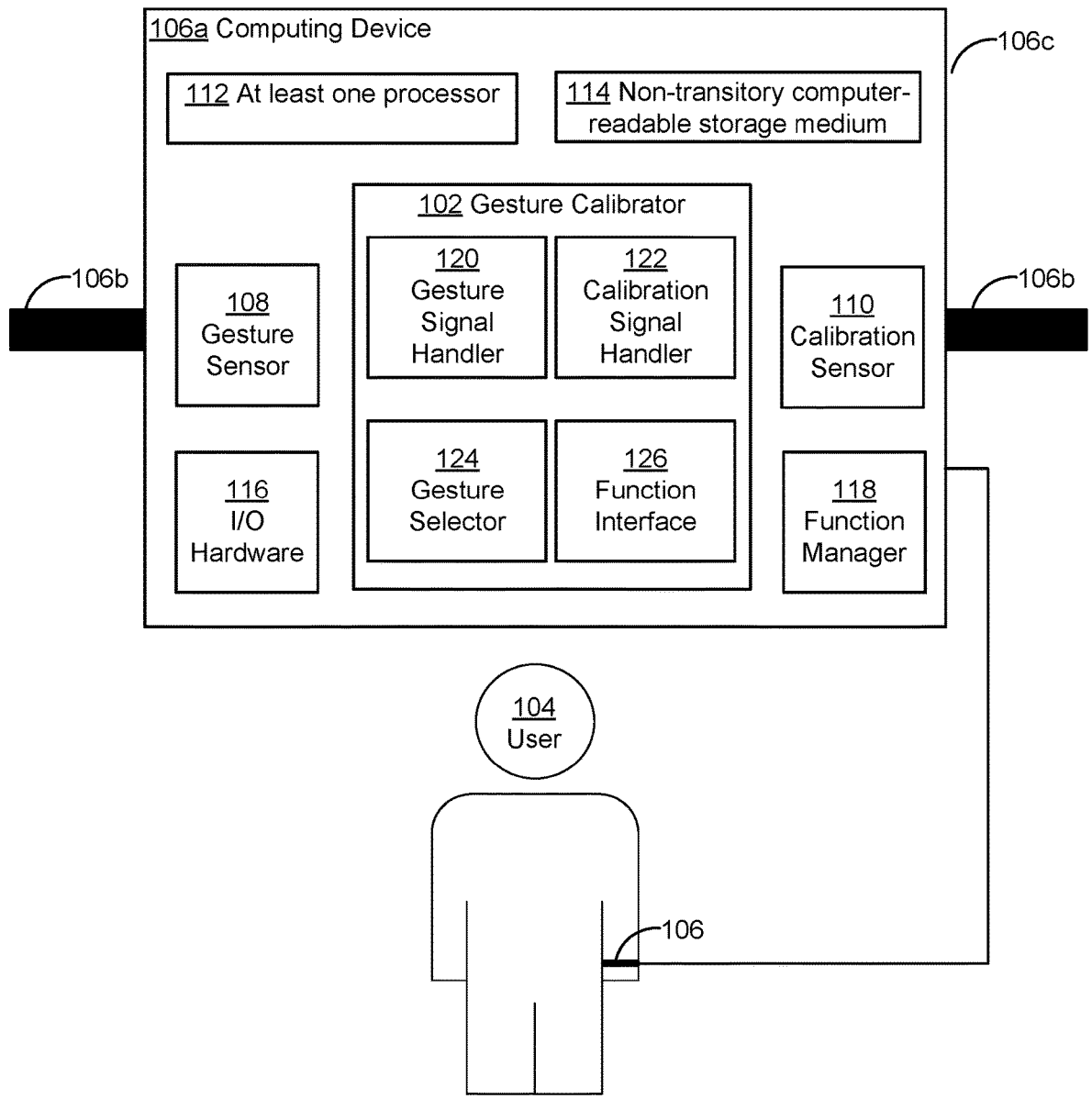
FIG. 1 is a block diagram of a system using a calibrated gesture signal to control at least one computing device.

Described systems and techniques enable gesture-based interactions with devices, including wearable devices and held devices (that is, devices currently being worn and/or held by a user). Gesture signals may be measured to provide gesture measurements, which may then be scored, calibrated and otherwise characterized for use in implementing the gesture-based interactions. Accordingly, gestures may be used to provide accurate and consistent control of one or more devices.

For example, a gesture signal may be updated using a calibration signal, in order to correct or account for errors in the original gesture signal, and thereby obtain a calibrated gesture signal. The calibrated gesture signal may be measured, scored, or otherwise characterized or processed as needed, and used as input to control a desired function of a device. The calibrated gesture signal may thus be used to provide the desired function in a consistent, repeatable, and granular manner, across many different users and use case scenarios.

Although various types of gesture detection and gesture-based control are known, existing methods are incapable of sufficiently accounting for variations in user movements, particularly across variations in a manner in which users wear, hold, or otherwise utilize gesture sensors. For example, many users may implement a single gesture in different ways (e.g., vigorously, or gently).

Moreover, gesture sensors are often worn on a user's body part (e.g., a user's wrist), or held in a user's hand, in order to determine gesture measurements. Accuracy of the gesture measurements may be impacted by a manner in which the gesture sensors are worn or held by the users. For example, a gesture sensor attached to a user's wrist (e.g., using a wristband, or a watch) may be attached with varying levels of tightness, which may lead to corresponding variations in obtained gesture measurements (e.g., gesture scores) associated with gestures of the user's hand or arm.

In specific examples, as just referenced, a watch may be worn on a user's wrist, and may be configured to implement one or more gesture sensors. The watch may use the gesture measurements obtained using the gesture sensors to control functions of the watch, or may transmit the gesture measurements to a second device, to control functions of the second device. The user may thus be provided with an ability to use seamless, convenient, natural, and discreet gestures to control one or more devices.

However, as also referenced, a user may wear the watch with varying levels of tightness, so that a fit of the watch on the user's wrist may range from very loose to very tight. Moreover, changes in tightness may correspond with, or result in, changes in alignment, position, or orientation of a worn or held device. A gesture sensor implemented by a watch or other device may be configured based on an expected range of tightness, so that any fits outside of the expected range may lead to a loss of accuracy and precision in resulting gesture measurements from the gesture sensor.

In such scenarios, a tightness-based calibration sensor may be used to detect a degree of tightness and/or other aspects of a manner in which the watch is worn. The tightness-based calibration sensor may thus provide a calibration measurement or other calibration signal that is specific to the user, and to the user's current wearing of the watch. The calibration signal may thus be used to adjust or otherwise calibrate a current gesture signal, and thereby improve the accuracy and precision of any device function implemented based on the gestures of the user.

FIG. 1 is a block diagram of a system using a calibrated gesture signal to control at least one computing device. In FIG. 1, a gesture calibrator 102 is illustrated as being worn or held by a user 104, as part of a gesture detecting device 106, which may also be referred to as a gesture detector 106.

In the example of FIG. 1, the gesture detector 106 includes a computing device 106a and an optional fastener 106b. The gesture detector 106 may be worn at the end of an arm of the user 104, e.g., on the user's wrist, hand, or finger. Thus, the gesture detector 106 may be implemented using, e.g., a watch, a band, a strap, a bracelet, or a ring.

However, as referenced in more detail below, such examples are non-limiting, and the gesture detector 106 may be worn on any suitable or desired body part of the user 104 for purposes of capturing desired gestures. For example, the wearable gesture detector 106 may be worn on a user's leg (e.g., ankle), or may be integrated into a head-mounted device (HMD), including smartglasses or earbuds. In still other examples, the gesture detector 106 may be integrated into items of clothing, such as gloves, socks, belts, or shirt sleeves. Specific examples of wearable versions of the gesture detector 106 of FIG. 1 are provided below, with respect to FIGS. 9-12.

When the gesture detector 106 is wearable, the fastener 106b may be understood to represent any suitable component, material, and related fastening technique for allowing the user 104 to wear the wearable gesture detector 106 in a desired manner. For example, the fastener 106b may be an adjustable fastener, using, e.g., a clasp, buckle, clip, button, tie, or snap. In such examples, the fastener 106b may be separate from, e.g., attached to, the computing device 106a.

In other examples, the fastener 106b may be integral to the computing device 106a. For example, the gesture detector 106 may be implemented as a ring to be worn on a finger of the user 104, as in the example of FIG. 12. In these and similar examples, the fastener 106b may refer to a body of the ring, which may not be adjustable.

In additional or alternative examples, the fastener 106b may be omitted, and the computing device 106a may be held by the user 104. In such cases, the user 104 may hold the computing device 106a with varying degrees of tightness, which may vary from person to person, and from moment to moment.

For example, FIG. 13, described below, illustrates an example of a held implementation of the gesture detector 106, using a smartphone. However, the computing device 106a may be configured as a held implementation in many different ways, and using many different form factors. For example, the computing device 106a may be constructed as a pointer for use in giving presentations, or as part of a joystick or other gaming device for gaming implementations, or as part of any held I/O device for controlling a desktop computer.

In general, wearing the gesture detector 106 thus refers to any scenario in which the fastener 106b causes the gesture detector 106 to remain on a body part of the user 104, without requiring further action on the part of the user 104. Holding the gesture detector 106 refers to scenarios in which the gesture detector 106 is maintained in contact with, or in the physical possession of, the user 104, as a result of an action of the user 104 that is maintained during the holding. For example, such holding may include grasping, grabbing, or carrying.

It is possible to both wear and hold the gesture detector 106 at a same or overlapping time. For example, the gesture detector 106 may be worn on one arm or hand, and held by the other hand at the same time, or may be worn in a position in which it is possible to be held (e.g., at the end of a sleeve, or on another article of clothing).

FIG. 1 further illustrates that the computing device 106a may include a body 106c. As may be appreciated from the various examples provided herein, the body 106c may be any housing or casing suitable for enabling the wearing or holding of a particular implementation of the gesture detector 106.

The body 106c may be configured for the mounting of, or coupling to, one or more sensors and other components, including a gesture sensor 108 and a calibration sensor 110. For example, the gesture sensor 108 may represent any suitable hardware and associated software for capturing a gesture of the user 104.

For example, a gesture generally may refer to or include a movement of a user. A gesture may be made with an intention to convey a desired meaning, or otherwise to cause a desired result. A gesture may also be interpreted as initiating a pre-determined effect, even if not intended by the user.

A gesture may be defined at varying levels of specificity. For example, a gesture may be defined with respect to a movement of one or more body parts of the user, such as a finger, hand, foot, or head of the user, or combinations thereof. Many specific types of movements may be defined as interpretable gestures, including direction, distance, velocity, force, angular rate, or orientation, muscle tension, or combinations thereof. Such movements may be performed by one or more defined body parts of the user 104 (e.g., a finger), either individually or in combination with (or relative to) one another (e.g., a snapping or pinching gesture with two fingers).

Many techniques exist for detecting, capturing, and utilizing a gesture of a user. For example, accelerometers, gyroscopes, magnetometers, inertial measurement units (IMUs), or high-frequency radar chips, or combinations thereof, may be used to capture a gesture signal. Similarly, various techniques may be used to process captured, raw gesture signals, to thereby facilitate mapping thereof to one or more pre-defined functions of the computing device 106a (including sending instructions to implement one or more functions of a second computing device, in communication with the computing device 106a).

For example, a trained machine learning model may be used to relate a gesture to a function of the computing device 106a. In other examples, gestures may be heuristically related to functions of the computing device 106a. For example, when the gesture detector 106 is implemented using a smartwatch, the user 104 may make a gesture such as pinching or waving. The gesture may be captured and characterized by the gesture sensor 108, and may be related to a pre-determined function of the computing device 106, as just referenced.

In practice, however, as also referenced, it is difficult to implement such gesture-based control techniques with desired levels of accuracy and precision. For example, users may perform gestures in variable or individualized manners. Moreover, it is often desirable to capture small and/or transient gestures on the part of the user 104, because such gestures may be performed quickly, easily, and discreetly by the user 104. However, such gestures are generally more difficult to capture and utilize than gestures that are longer in duration or less fine-grained in nature.

One factor that exerts influence on an accuracy and precision of captured gestures relates to a degree of tightness with which the gesture detector 106 is worn or held by the user 104. For example, the user 104 may fasten the fastener 106b to a different extent (e.g., tighter, or looser) than other users. The user 104 may also fasten the fastener 106b to a different extent at one time versus another, e.g. from day-to-day, or in different contexts or situations.

Even if a manner in which the fastener 106b is fastened is not changed by the user 104, changes to the user 104 over different time periods or in different contexts may similarly affect operations of the gesture sensor 108. For example, the ambient temperature or humidity being experienced by the user 104 may vary, and may cause the gesture detector 106 to be tighter or looser over time. Similarly, physical activities or actions of the user 104 (e.g., exercising or resting) may impact operations of the gesture sensor 108.

In implementations in which the computing device 106a is held by the user 104, rather than being worn, such variations in tightness may also occur. For example, the user 104 may squeeze the computing device 106a to a greater or lesser extent while performing a gesture and holding the computing device 106a.

Thus, variations in tightness of worn or held gesture sensors generally lead to degradations of gesture signal quality, and corresponding reductions in feature accuracy when using the degraded gesture signals. In the example of FIG. 1, however, the calibration sensor 110 is configured to generate a calibration signal that is used by the gesture calibrator 102 to adjust, characterize, change, or otherwise calibrate the gesture signal obtained from the gesture sensor 108.

For example, in various implementations described below, the calibration sensor 110 may be implemented as an optical, acoustic, or radar-based device. For example, the calibration sensor 110 may be implemented using a photoplethysmography (PPG) sensor. A PPG sensor, for example, may use a light source and a photodetector (e.g., photodiode) at a skin surface of the user 104 to measure volumetric changes of blood circulation of the user 104. Such volumetric changes, and related changes, may be used, for example, to determine a heart rate, respiration rate, and other biometric factors.

In FIG. 1, the calibration sensor 110 may utilize a PPG signal or other calibration signal of the calibration sensor 110 to characterize a degree of tightness with which the computing device 106a is held or worn. In various implementations, the degree of tightness may characterize, or be related to, an extent to which the computing device 106a is distant from a skin surface of the user 104. The degree of tightness may characterize, or be related to, a circumference or other perimeter of the fastener 106b when fastened or worn, e.g., relative to a circumference of a wrist, finger, or other body part of the user 104 when wearing the gesture detector 106. Tightness may be determined with respect to a degree of compression or deformation of a skin surface of the user 104, or other physical characteristics of the skin surface, such as color, texture, tension, or moisture. Tightness may be related to other physiological measures related to the user 104, such as blood volume measurements.

The phrase 'degree of tightness' should thus be understood to encompass a range from 'very loose,' to 'very tight.' The degree of tightness may be characterized discretely, e.g., by assigning predetermined, predefined levels of tightness to a current wearing or holding of the computing device 106a by the user 104. The degree of tightness could also be determined continuously within a predetermined range.

Tightness may be characterized using any suitable unit of measure. For example, tightness may be characterized using units of length, distance, area, force, or pressure. It will be appreciated from the various examples that different techniques for measuring or characterizing tightness may depend in part on the type of the gesture detector 106 (e.g., the type of gesture sensor 108 and/or calibration sensor 110) being used.

For purposes of the following description, an optimal or pre-determined level of tightness corresponds to a level of tightness within the just-referenced range of tightness at which the gesture sensor 108 is designed to capture pre-defined gestures. In other words, the optimal level of tightness refers to a level most likely to correspond to a correct gesture interpretation by the gesture sensor 108. As referenced above, and described in detail, below, the gesture calibrator 102 may be configured to adjust or calibrate a gesture signal of the gesture sensor 108 to correspond to such an optimal level, and thereby correctly infer a gesture performed by the user 104, even when the gesture detector 106 is not being worn or held at the optimal level (e.g., is being worn too tightly, or too loosely).

In the example of FIG. 1, the computing device 106a is illustrated as including at least one processor 112, a non-transitory computer-readable storage medium 114, various types of input/output (I/O) hardware 116, and a function manager 118. The computing device 106a should be understood to potentially represent two or more computing devices in communication with one another, some examples of which are provided herein. The at least one processor 112 may thus represent one or more processors on such computing device(s), which may be configured, among other functions, to execute instructions stored using the non-transitory computer-readable storage medium 114.

As the at least one computing device 106a may represent many types of computing devices, examples of which are provided herein, the many types of input/output (I/O) hardware that may be used in such computing devices are illustrated in the aggregate in FIG. 1 as I/O hardware 116. By way of non-limiting example, such I/O hardware may include a display (e.g., a touchscreen), a button, a speaker or audio sensor, haptic sensor or output, camera, or a peripheral device (e.g., mouse, keyboard, or stylus).

In addition to the I/O hardware 116, the at least one computing device 106a may execute and provide many types of software that utilizes, or is implemented by, the at least one processor 112, the non-transitory computer-readable storage medium 114, and the I/O hardware 116. Such software (and associated functionality) is included and represented in FIG. 1 by a function manager 118.

That is, for purposes of the description of the simplified example of FIG. 1, the function manager 118 should be understood to represent and encompass the implementation of any software that may be associated with operation of the I/O hardware 116. For example, the function manager 118 may include an operating system and many different types of applications that may be provided by the at least one computing device 106a, some examples of which are provided in more detail, below.

As also described herein, gestures determined by the gesture calibrator 102 may thus be used to control any of the I/O hardware 116, and/or any functions of the at least one computing device 106a, using the function manager 118. For example, a gesture determined by the gesture calibrator 102 may cause the function manager 118 to transmit a signal to a second computing device with an instruction to implement a specified function, corresponding to the gesture, at the second computing device.

In more detail, as shown, the gesture calibrator 102 may include a gesture signal handler 120, which may be configured to receive a gesture signal from the gesture sensor 108. A nature of the gesture signal may depend on a type of the gesture sensor 108 being used, such as the various example gesture sensors described herein. The gesture sensor 108 may output a raw gesture signal, or may provide some degree of processing of a raw gesture signal prior to providing the gesture signal to the gesture signal handler 120. Similarly, the gesture signal handler 120 may provide various types and degrees of signal processing of the gesture signal, e.g., to facilitate calibration thereof. For example, as the gesture sensor 108 may include one or more of the various types of gesture sensors described herein, the gesture signal handler 120 may be configured to generate a sensor-agnostic continuous gesture score that enables or facilitates use of the gesture calibrator 102 with all such gesture sensors.

A calibration signal handler 122 may similarly interface with the calibration sensor 110 to receive a calibration signal. Also similarly, either or both of the calibration sensor 110 and/or the calibration signal handler 122 may provide some type or degree of processing of the calibration signal.

For example, as described in detail, below, the calibration signal may be more time-invariant than the gesture signal. For example, if the gesture detector 106 is a wristband worn at a certain level of tightness, that level of tightness may be maintained for a time period of minutes or hours, whereas gestures may be detected over a timespan of seconds or less. Moreover, multiple gestures may occur in succession. Consequently, it may not be necessary or desirable to measure or characterize the calibration signal as frequently or as quickly as the gesture signal.

For example, the calibration signal handler 122 may buffer the calibration signal, and/or may use the same calibration signal value(s) over multiple gesture calibrations of multiple gesture signals. Additionally, the calibration signal handler 122 may be configured to represent the calibration signal (e.g., using the buffered calibration signal) as a spectral feature (e.g., using a Fast Fourier Transform (FFT)), to make the calibration signal less dependent on time, and to make the calibration signal compatible with the gesture score provided by the gesture signal handler for common processing thereof.

Thus, both the gesture signal handler 120 and the calibration signal handler 122 may be configured to process the gesture signal and the calibration signal, respectively, in order to facilitate further processing thereof by a gesture selector 124. For example, as referenced above and described in detail below, both the gesture signal handler 120 and the calibration signal handler 122 may be configured to provide the gesture signal and the calibration signal in a common or compatible format(s), e.g., as feature vectors, that are suitable for processing by the gesture selector 124.

In some implementations, the gesture selector 124 may be implemented using a trained machine learning model, examples of which are provided below. For example, as referenced above, the gesture detector 106 may be designed to detect gestures of the user 104 when the user 104 is wearing or holding the gesture detector 106 at an optimal, pre-defined level of tightness. A machine learning model may be trained using known, performed gestures (and associated gesture signals) as ground truth data, but with corresponding levels or degrees of tightness (characterized by ground truth calibration signals) that are known to be higher or lower than the optimal, pre-defined level of tightness. Then, when an actual level of tightness is higher or lower in a particular use case, the gesture selector 124 may thus calibrate a received gesture signal, based on the received calibration signal and the trained machine learning model, to select a gesture that would have been selected if the user 104 were wearing or holding the gesture detector with the optimal, pre-defined level of tightness.

Many different numbers and types of gestures may be available for selection. Various gestures may be associated with specific applications or specific types of I/O hardware 116. For example, when the user 104 is using a particular application of the computing device 106a, or a connected computing device, a pre-defined set of gestures may be associated with that application, including with specific functions of the application. Accordingly, the gesture selector 124 may select from among the pre-defined gestures, or may determine that no gesture has been made.

Once a gesture is selected by the gesture selector 124, a function interface 126 may be configured to communicate with the function manager 118 to implement a corresponding function. As referenced above, the corresponding function may be related to control of any of the I/O hardware 116, and/or control of any software (e.g., application) implemented by the computing device 106a, including sending a control signal to a second, separate device to instruct the second, separate device to perform a function corresponding to the detected gesture.

In some implementations, feedback may be provided to the user 104, characterizing the gesture or implemented results of the gesture. For example, the gesture selector 124 or the function interface 125 may provide visual, audio, or haptic indicators to the user 104.

Figure 2:
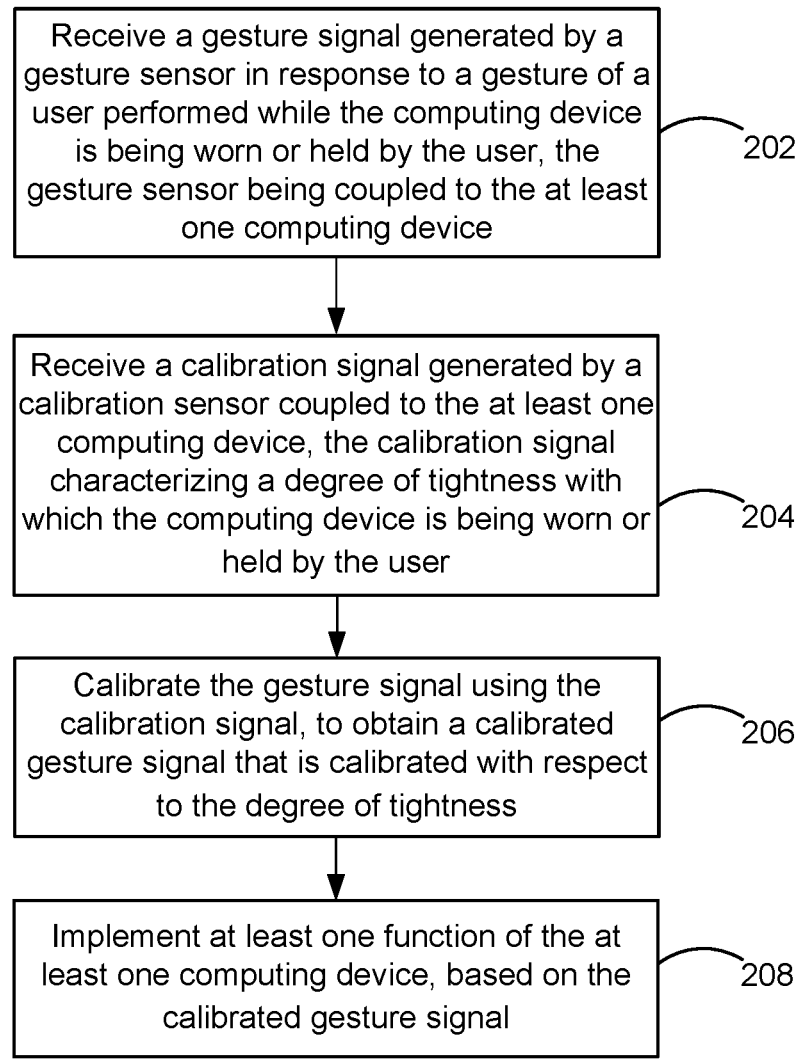
FIG. 2 is a flowchart illustrating example operations of the system of FIG. 1.

FIG. 2 is a flowchart illustrating example operations of the system of FIG. 1. In the example of FIG. 2, operations 202-208 are illustrated as separate, sequential operations. However, in various example implementations, the operations 202-208 may be implemented in an overlapping or parallel manner, and/or in a nested, iterative, looped, or branched fashion. Further, various operations or sub-operations may be included, omitted, or substituted.

In FIG. 2, a gesture signal generated by a gesture sensor in response to a gesture of a user performed while the computing device is being worn or held by the user may be received, the gesture sensor being coupled to the at least one computing device (202). For example, the gesture sensor 108 may generate a gesture signal in response to a gesture of the user 104, while wearing and/or holding any of the example implementations of FIGS. 9-13, or other implementations.

For example, the gesture sensor 108 may include an optical, acoustic, vibrational, radio wave, gyroscopic, inertial, or other type of sensor capable of detecting, monitoring, measuring, characterizing, and/or otherwise determining any gesture of the user 104. Examples include the above-referenced IMU sensor, ultrasonic sensors, and various types of radar-based sensors. For example, IMU sensors are capable of detecting vibrations that occur in a user's hand or arm when the user 104 performs various gestures, such as snapping, pinching, waving, or making a fist.

As described, the at least one computing device 106a may include any computing device(s) which may benefit from the types of gesture input described herein, including laptops, tablet computers, smartphones, smartwatches, smart glasses, earbuds, and other wearable devise. Other examples of types of devices may include cameras, kiosks, gaming platforms, peripheral devices (e.g., keyboard, mouse, or stylus), cooking appliances, and various other types of appliances. For example, the at least one computing device 106a may include a smartwatch (e.g., FIG. 9) or a ring (e.g., FIG. 12) that is used to provide gesture-based control of one or more connected devices, such as those just referenced. Thus, in some implementations, the gesture sensor 108 may be provided on a device being worn or held by the user 104, while some or all associated processing and storage hardware may be maintained on a separate device, in wired or wireless communication therewith.

The gesture sensor 108 may provide some degree of processing of the gesture signal. For example, the gesture sensor 108 may generate a gesture score characterizing a type and extent of a detected movement of the user 104 corresponding to a potential gesture.

A calibration signal generated by a calibration sensor coupled to the at least one computing device may be received, the calibration signal characterizing a degree of tightness with which the computing device is being worn or held by the user (204). For example, the calibration sensor 110 may include an optical, acoustic, vibrational, radio wave, or other type of sensor capable of detecting, monitoring, measuring, characterizing, and/or otherwise determining a degree of tightness with which the computing device 106a is being worn or held. For example, a LIDAR sensor, ultrasonic sensor, or radar sensor may be used. In other examples, a time of flight sensor or other proximity detection tool may be used to measure a distance of the computing device 106a to skin of the user 104, at a level of resolution of displacement of millimeters or less.

Thus, the calibration sensor 110 may be configured to detect various types of measurements providing tightness proxies, e.g., measurements that correlate in type or extent with the degree of tightness with which the computing device 106a is being held or worn. For example, when the calibration sensor includes a PPG sensor or other heart rate monitor, characteristics of a heart rate measurement of the user 104 may provide a tightness proxy. For example, when the gesture detector 106 is worn very tightly, an amplitude of a detected heart rate will generally be larger than when the gesture detector 106 is worn very loosely, as referenced above and described and illustrated in detail below with respect to FIGS. 4A-4C.

In example implementations, the fastener 106b may be configured to generate the calibration signal, or to facilitate generation of the calibration signal. For example, when the fastener 106b includes a wristband, the wristband may be associated with varying levels of adjustable tightness, and/or may include various calibration sensors configured to measure an extent of stretching of the wristband, which may be correlated with tightness.

The gesture signal may be calibrated using the calibration signal, to obtain a calibrated gesture signal that is calibrated with respect to the degree of tightness (206). For example, the gesture selector 124 may adjust the gesture signal (e.g., a gesture score) relative to a threshold, as illustrated below with respect to FIG. 8. An extent to which such adjustment or other calibration should be performed may be determined heuristically, such as by relating gesture score adjustments with defined levels of tightness, and then making specific gesture score adjustments when corresponding levels of tightness are detected.

In other examples, as referenced above and described and illustrated in detail below with respect to FIGS. 5 and 6, a machine learning model may be used. For example, a trained machine learning model may be constructed and stored in a memory of the at least one computing device 106a. Then, during use, the gesture signal and the calibration signal may both be provided to the trained machine learning model, which then outputs the calibrated gesture signal.

At least one function of the at least one computing device may be implemented, based on the calibrated gesture signal (208). For example, the function interface 126 may communicate with the function manager 118 to implement virtually any available function of the at least one computing device 106a, including the function of sending a command to a separate device to instruct the separate device to perform a defined function. In other words, the at least one computing device may include at least a first computing device and a second computing device, with the gesture sensor and the calibration sensor coupled to the first computing device. Then, implementing at least one function can include transmitting a command from the first computing device to instruct the second computing device to perform at least a second function.

As described herein, such functionality may be dedicated, such as when performing a gesture provides a dedicated, pre-configured function. In other examples, the functionality may be configurable by the user 104, such as when the user 104 can designate a desired function to be performed in response to a specific gesture. In some implementations, the functionality may vary by context. For example, the functionality providing in the context of one application may be different than the functionality provided in another context.

FIGS. 3-8 are illustrated and described with respect to specific implementation examples in which a smartwatch or other wrist-based wearable device (e.g., wristband 402 of FIGS. 4A-4C) incorporates an IMU sensor as the gesture sensor 108 and a PPG sensor as the calibration sensor 110. Thus, as referenced above, the PPG sensor uses a measurement of a heart rate of the user 104 as a proxy for characterizing a tightness with which the user 104 is wearing the wristband 402.

Figure 3:
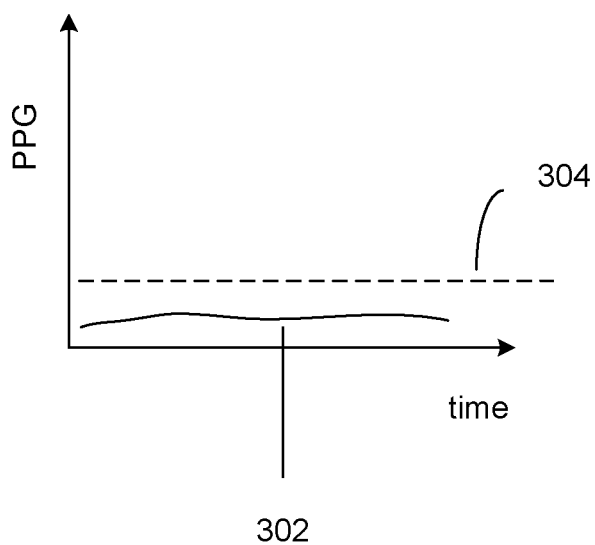
FIG. 3 is a graph illustrating a threshold condition for confirming that a device is being worn by a user during example implementations of FIG. 1.

FIG. 3 is a graph illustrating a threshold condition for confirming that a device is being worn by a user during example implementations of FIG. 1. Specifically, a PPG signal 302 has an amplitude (e.g., optical amplitude) that is below that of a threshold 304 that would be met if the wristband 402 were being worn by the user 104. In other words, FIG. 3 illustrates an example in which the wristband 402 is not being worn by the user 104.

Figure 4A:
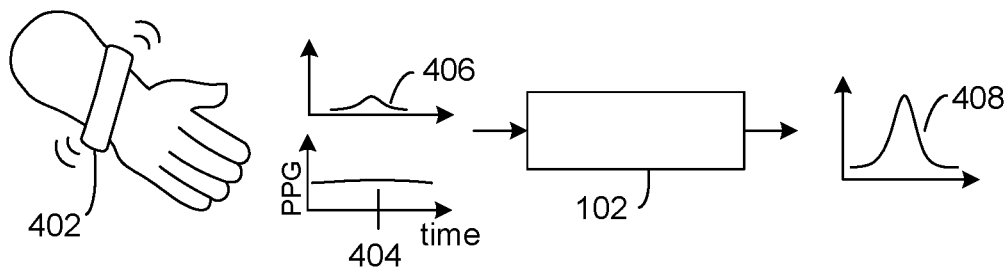
FIG. 4A illustrates graphs demonstrating a first example of calculating a tightness-corrected gesture score, in accordance with example implementations of FIG. 1.

In contrast, FIG. 4A illustrates graphs demonstrating a first example of calculating a tightness-corrected gesture score, in accordance with example implementations of FIG. 1. Specifically, FIG. 4A illustrates an example in which the wristband 402 is worn loosely by the user 104.

In FIG. 4A, a calibration signal 404 corresponds to the signal 302 of FIG. 3, but with a higher amplitude (e.g., mean value) indicating that the wristband 402 is currently being worn, as illustrated. As also illustrated, the calibration signal 404 has a waveform with a low amplitude fluctuation (e.g., fluctuation around a mean value).

Meanwhile, gesture signal 406, provided by an IMU included in the wristband 402, may also be detected. As referenced above, and shown in FIG. 4A, the gesture signal 406 may deviate from an expected value or other expected aspect when the wristband 402 is worn loosely.

Therefore, when the gesture signal 406 and the calibration signal 404 are provided to the gesture calibrator 102, as shown, the gesture calibrator 102 may be configured to output a tightness-corrected, calibrated gesture signal 408. For example, if a raw gesture score of the gesture signal 406 has a negative deviation from an expected norm, the resulting calibrated gesture signal 408 may be amplified or increased to correct for the negative deviation.

Figure 4B:
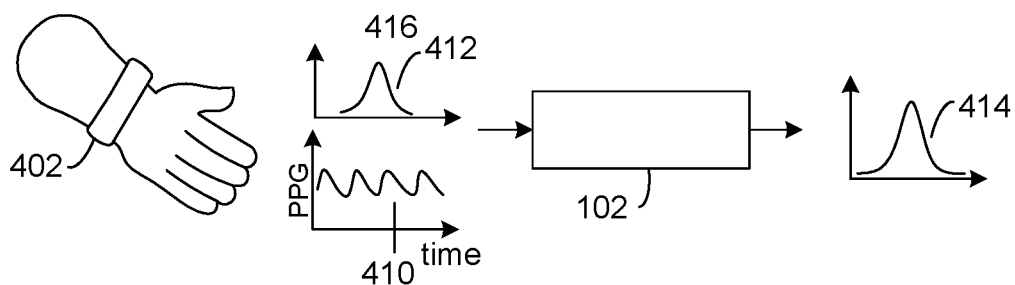
FIG. 4B illustrates graphs demonstrating a second example of calculating a tightness-corrected gesture score, in accordance with example implementations of FIG. 1.

In FIG. 4B, the wristband 402 is illustrated as being worn at a snug or optimal level of tightness. Consequently, a PPG calibration signal 410 demonstrates a high quality waveform, with expected type and degree of amplitude fluctuation. Further, a detected gesture signal 412 also corresponds to an expected waveform. As a result, the gesture calibrator 102 provides little or no calibration or adjustment of the gesture signal 412, and provides an output gesture signal 414 that closely resembles the original gesture signal 412.

Figure 4C:
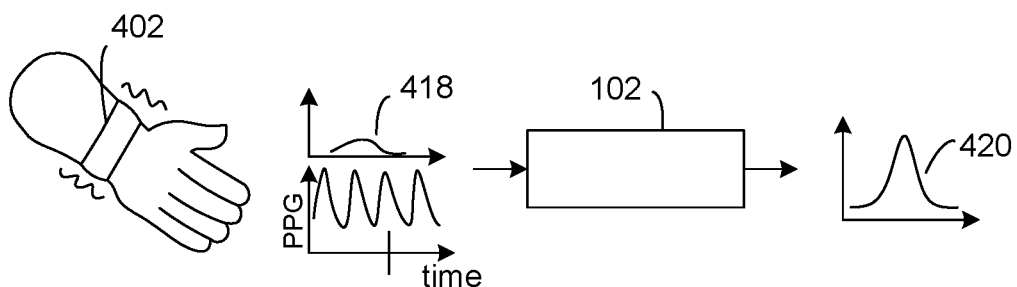
FIG. 4C illustrates graphs demonstrating a third example of calculating a tightness-corrected gesture score, in accordance with example implementations of FIG. 1.

In FIG. 4C, the wristband 402 is illustrated as being worn at a higher level of tightness. Consequently, a PPG calibration signal 416 demonstrates a waveform with a higher than expected degree of amplitude fluctuation. A detected gesture signal 418 illustrates a reduced quality that corresponds to the overly-tight condition of the wristband 402. As a result, the gesture calibrator 102 provides necessary calibration or adjustment of the gesture signal 418 (e.g., a positive deviation from an expected norm may be reduced), and provides an output gesture signal 420 that closely resembles the expected gesture signal 412, as well as the output gesture signals 408, 414 of FIGS. 4A and 4B, respectively.

Figure 5A:
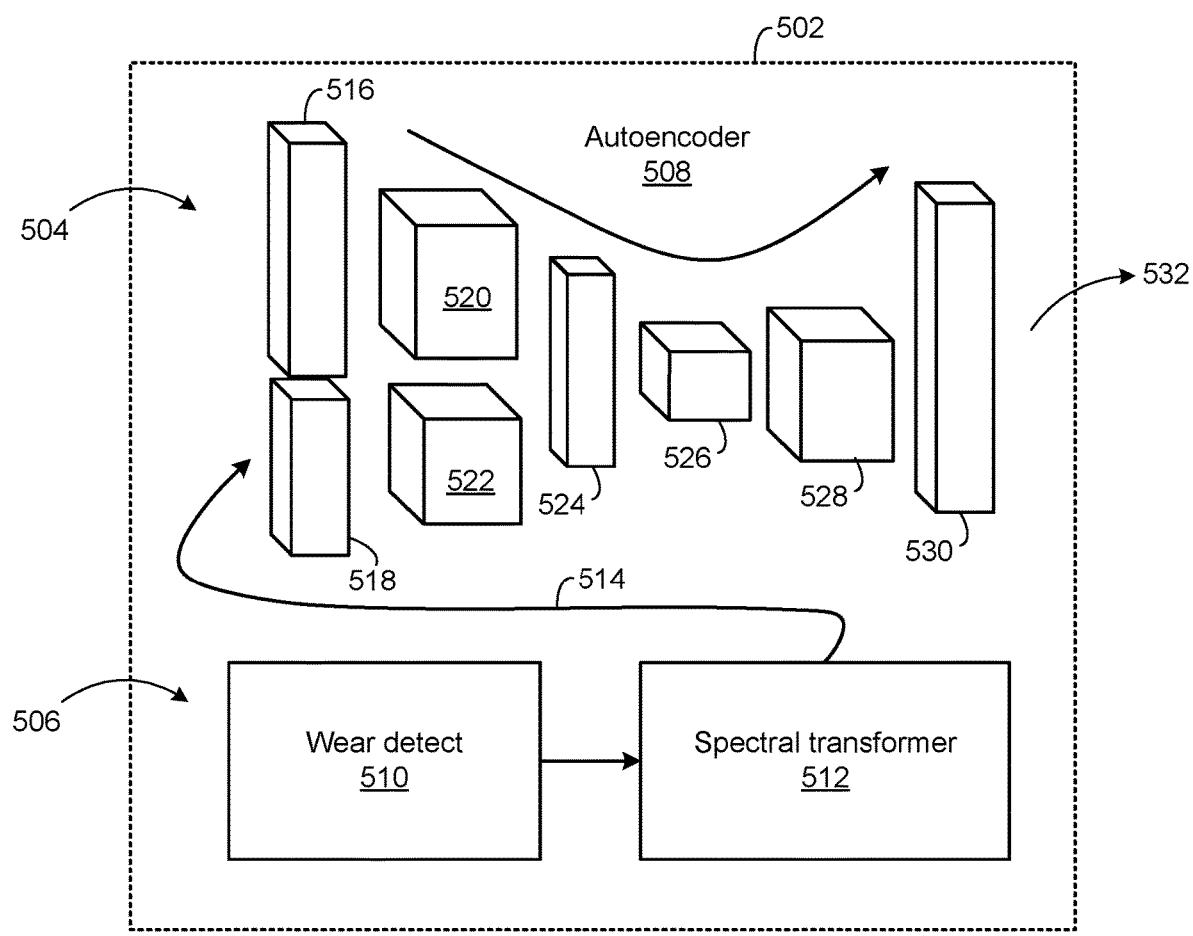
FIG. 5A is a block diagram illustrating more specific example implementations of aspects of a gesture calibrator, in accordance with example implementations of FIG. 1.
Figure 5B:
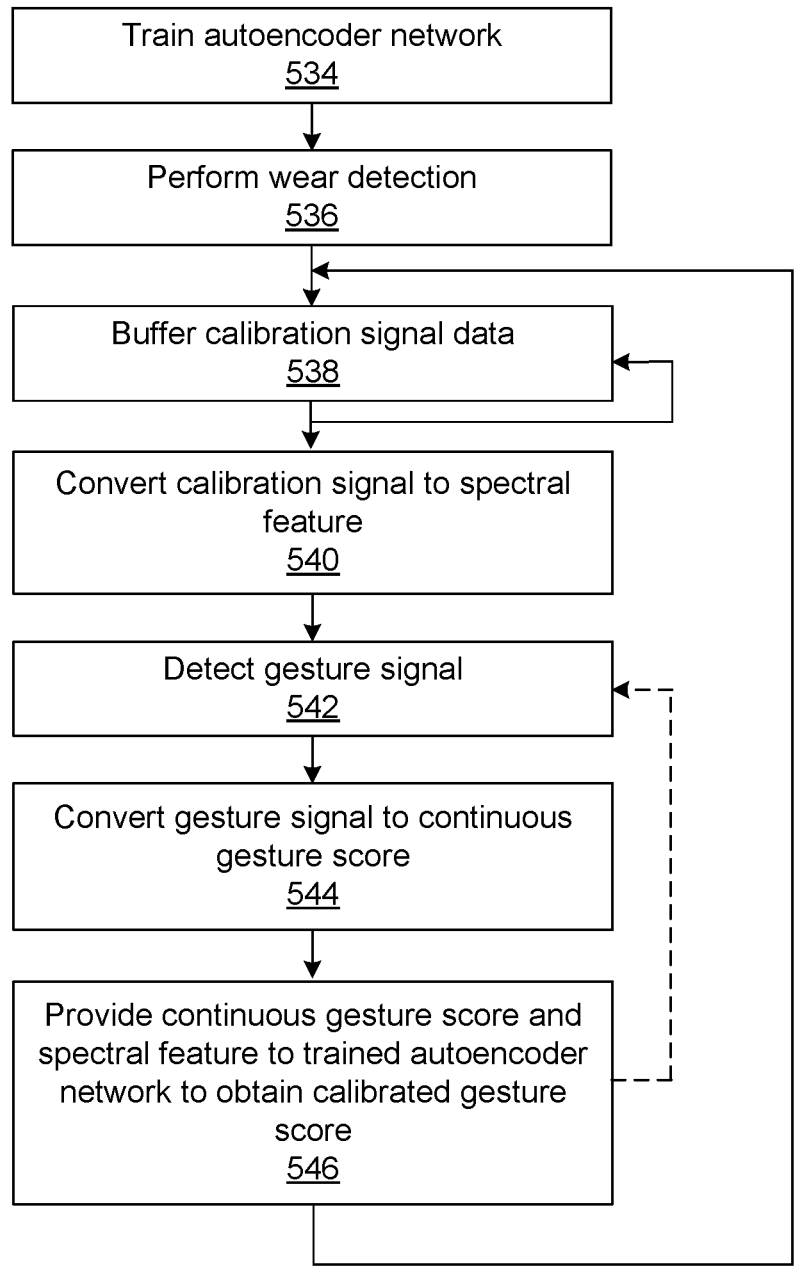
FIG. 5B is a flowchart illustrating example operations of the example of FIG. 5A.

FIG. 5A is a block diagram illustrating more specific example implementations of aspects of the gesture calibrator 102, in accordance with example implementations of FIG. 1. FIG. 5B is a flowchart illustrating example operations of the example of FIG. 5A.

In FIG. 5A, a gesture calibrator 502 receives a gesture signal 504 and a calibration signal 506. As described with respect to FIG. 1, the gesture signal 504 may be received from a gesture sensor (e.g., the gesture sensor 108), and may be subject to various types of processing (e.g., conversion to a continuous gesture score by either the gesture sensor 108 and/or the gesture signal handler 120).

An autoencoder 508 is illustrated as providing an example of the gesture selector 124 of FIG. 1. As referenced above, the autoencoder 508 represents or includes a trained machine learning model that is configured to calibrate the gesture signal 504 using the calibration signal 506, to thereby obtain a calibrated gesture signal 532.

In more detail, a wear detector 510 may be configured to determine whether the gesture detector 106 is currently being worn, as described above with respect to FIG. 3. For example, the wear detector 510 may determine whether a DC component of a PPG signal is above a threshold (e.g., threshold 304 in FIG. 3).

When wearing of the gesture detector 106 is determined, a spectral transformer 512 may be configured to transform the calibration signal 506 into a feature vector 514. For example, the spectral transformer 512 may calculate a FFT of the calibration signal 506 over a pre-defined period of time, during which the calibration signal 506 is buffered. More detailed examples of operations of the spectral transformer 512 are provided below with respect to FIG. 5B, and illustrated and described with respect to FIGS. 6 and 7.

The autoencoder 508 may include a neural network that is configured to map an input to a similarly-sized output, by training the neural network with a ground truth of a desired output. For example, the autoencoder 508 may be trained prior to manufacture and sale of the gesture detector 106, using a large-scale data collection across a sufficiently large number of users, and with the user wearing the gesture detector 106 at varying, known levels of tightness (and/or other wear factors). Further, expected, correct gesture scores may be known in advance and stored together with the corresponding wear conditions at the time(s) of detected gestures.

Using such training data, it is possible to determine an extent of amplification or other adjustment needed for each wear condition to obtain the expected, correct gesture score(s). For example, such training data may be used to train the neural network of the autoencoder 508 as a supervised learning algorithm to provide normalization and calibration of the gesture signal 504. In other words, the autoencoder 508 may be configured to input the pair of signals represented by the gesture signal 504 and the calibration signal 506, and, using the annotated, collected training data representing the ideal gesture calibration, may interpret the signal pair to fit the optimal function that will map a new input to the desired type or extent of calibration.

The resulting trained model may be stored, e.g., as a binary file, and embedded onto, or otherwise stored using, the gesture detector 106. Updates to the trained model may be downloaded or otherwise provided when available and feasible.

In the example of FIG. 5A, the autoencoder 508 includes an input layer 516 for the gesture signal 504, represented as a gesture score vector, and an input layer 518 for the feature vector 514. The autoencoder 508 includes convolutional filters 520 for the gesture score vector and convolutional filters 522 for the feature vector 514. As the resulting convolved vectors may be expressed in a relatively high dimensional space, a merged lower-dimensional embedding layer 524 may be used to jointly describe the convolved vectors in a lower-dimensional space. Then, a deconvolutional filter layer 526 and a deconvolutional filter layer 528 may be used to successively stretch and express the lower-dimensional embedding in a higher-dimensional space. The resulting higher-dimensional expression may then be passed to an output layer 530 that thereby produces the calibrated gesture signal 532. Of course, the autoencoder 508 is merely one example implementation of the gesture selector 124, and other implementations may be used. For example, other machine learning techniques may be used, or required calibration adjustments may be determined heuristically.

FIG. 5B is a flowchart illustrating an example implementation of the system of FIG. 1, using features of the gesture calibrator 502 of FIG. 5A. In FIG. 5B, the autoencoder 508 is trained (534) using a corpus of collected training data as ground truth data. As described, such training may occur prior to, or in conjunction with, manufacture and sale of the gesture detector 106.

To determine whether to proceed with gesture detection and calibration, wear detection may be performed (536). The wear detection check may be performed as a periodic check on a DC component of a PPG waveform, e.g., determining whether a mean of the PPG signal within a defined window of time is above a pre-determined threshold, as illustrated and described with respect to FIG. 3, and with respect to the wear detector 510 of FIG. 5A.

Upon successful wear detection, calibration signal data may be buffered (538). For example, the spectral transformer 512 may store calibration signal data over a defined period of time, e.g., 3 seconds, or 5 seconds, or any appropriate time period. Then, the calibration signal may be converted to a spectral feature (540).

Figure 6:
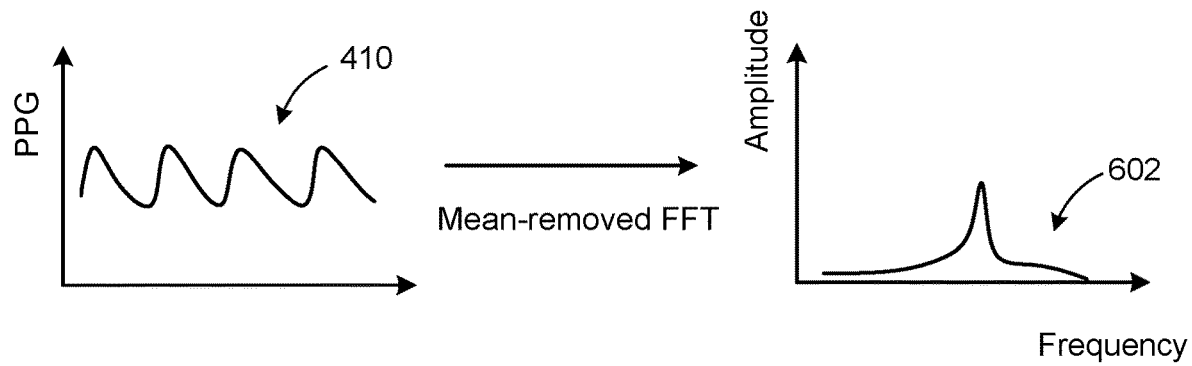
FIG. 6 is a graph illustrating a first example processing of a calibration signal of the example of FIGS. 5A and 5B.
Figure 7:
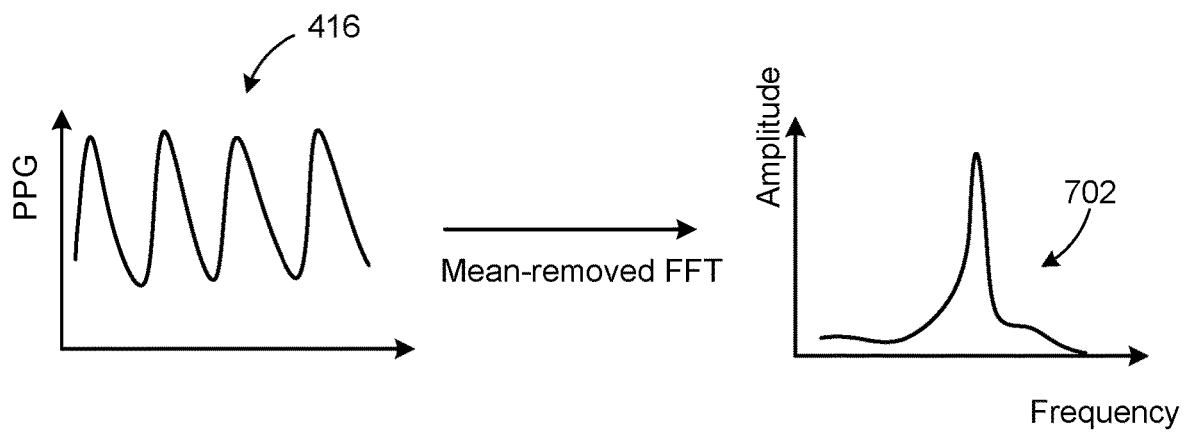
FIG. 7 is a graph illustrating a second example processing of a calibration signal of the example of FIGS. 5A and 5B.

For example, as illustrated in FIGS. 6 and 7, a mean-subtracted fast Fourier transform (FFT) of the PPG waveform may be computed in order to represent the PPG waveform using a phase-invariant feature. An example process may include first removing a mean component of the buffered PPG signal data, because the corresponding signal amplitude offset does not describe information related to a heartrate of the user 104. Then, the FFT may be calculated from the zero-mean PPG signal to obtain a spectral feature.

For example, FIG. 6 illustrates a conversion of the PPG signal 410 of FIG. 4B into a spectral feature 602, while FIG. 7 illustrates a conversion of the PPG signal 416 of FIG. 4C into a spectral feature 702. As illustrated by FIGS. 6 and 7, an amplitude of the spectral feature 602 is lower than that of the spectral feature 702 at corresponding frequencies, thereby quantifying an extent of calibration required for corresponding PPG waveforms and associated degrees of tightness with which the gesture detector 106 is worn or held.

A gesture signal may be detected (542), and converted into a continuous gesture score (544). For example, as described, many different types of gesture sensors may be used to detect many different types of gestures. Any resulting gesture signals, or combinations thereof, may be processed into a common format for providing as the gesture signal 504 of FIG. 5A.

Accordingly, the continuous gesture score and the spectral feature may be provided to the trained autoencoder network 508 to obtain the calibrated gesture signal 532 of FIG. 5A (546). As previously described, the example of FIG. 5B illustrates that the calibration signal may be buffered for a defined time window, and updated buffering may occur at a defined frequency. Meanwhile, the gesture signal may be detected at any time, dependent upon user selections, so that multiple gestures may occur within or between instances of processing buffered calibration signal data. For example, calibration signal data may be buffered for a time window of a few seconds, and such buffering (and related processing) may occur every few minutes. In other implementations, when the calibration signal is not buffered, the calibration signal may simply be collected and stored at a defined frequency, so that a current gesture signal may be calibrated using a most-recent calibration signal.

Although many types of gesture sensors and calibration sensors may be used, example implementations may select and implement sensor combinations having orthogonalized and independent measurements or measurement types, in order to take advantage of low correlations of measurement failures between the different types of sensors. In other examples, it may be possible to use similar or the same sensor modalities for both gesture detection and calibration, e.g., to save costs, or when lower levels of reliability, resolution, or granularity are required for gesture detection.

Figure 8:
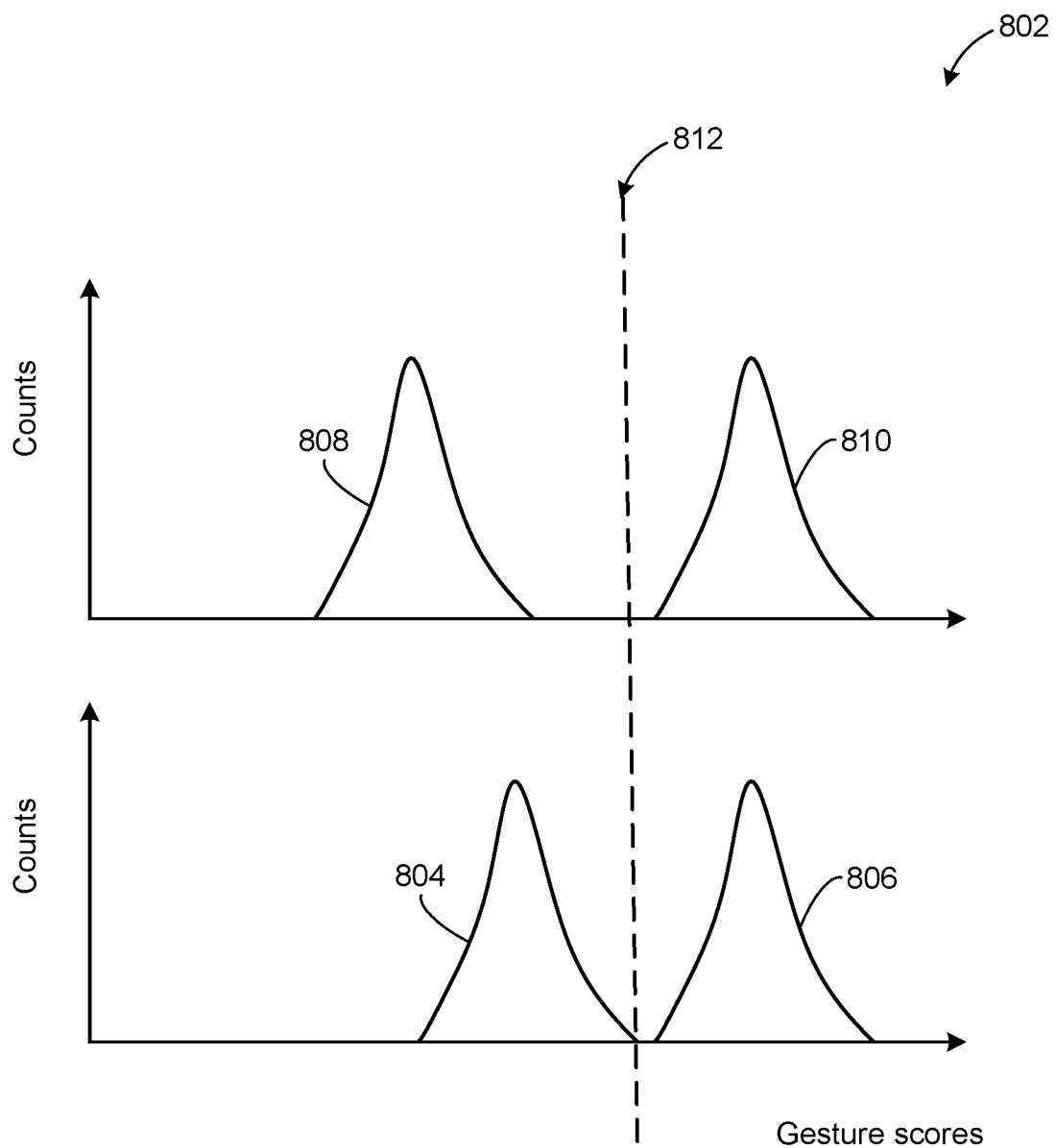
FIG. 8 is a graph illustrating examples of corrected gesture scores, in accordance with example implementations of FIGS. 1-7.

FIG. 8 is a graph 802 illustrating examples of corrected gesture scores, in accordance with example implementations of FIGS. 1-7. In FIG. 8, a signal 804 represents a no-gesture score for a first user, and a signal 806 represents a calibrated gesture score for the first user. A signal 808 represents a no-gesture score for a second user, and a signal 810 represents a calibrated gesture score for the second user. As may be observed, a common threshold 812 may thus be applied for purposes of detecting calibrated gesture scores 806, 810, even if the first user and the second user are wearing or holding gesture detectors 106 at different levels of tightness.

Figure 9:
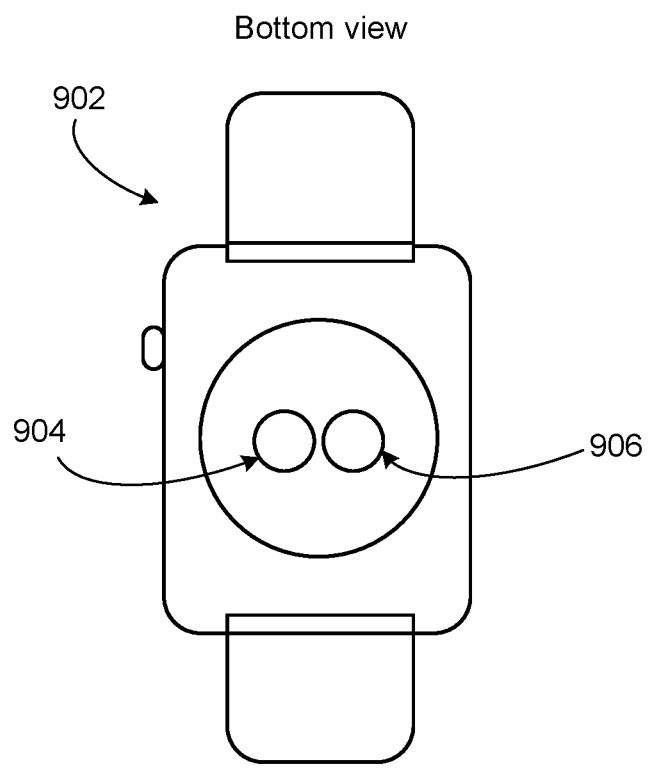
FIG. 9 is an example illustration of the system of FIG. 1, implemented using a smartwatch.

FIG. 9 is an example illustration of the system of FIG. 1, implemented using a smartwatch 902. More specifically, FIG. 9 illustrates a bottom view of the smartwatch 902, illustrating a gesture sensor 904 and a calibration sensor 906. During wear by the user 104, the gesture sensor 904 and the calibration sensor 906 may thus be positioned appropriately with respect to a wrist of the user 104 to detect gesture and heartrate information with respect to the user 104.

For example, the gesture sensor 904 may be implemented using an IMU sensor, while the calibration sensor 906 may be implemented using a PPG sensor. Such implementations may be advantageous because existing smartwatches already may include all required hardware (including processor and memory hardware), so that the gesture calibrator 102 of FIG. 1 may be implemented using software executed by the smartwatch 902.

Figure 10:
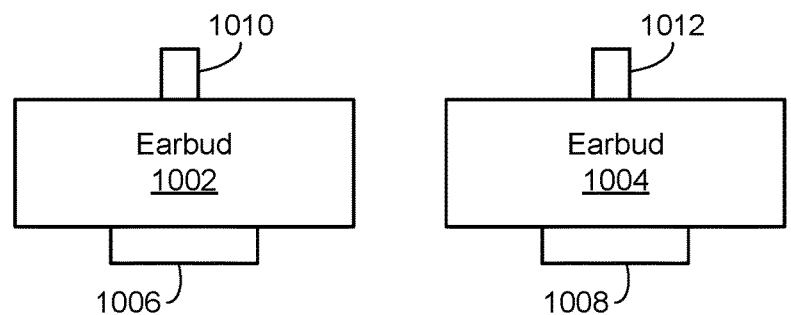
FIG. 10 is an example illustration of the system of FIG. 1, implemented using earbud devices.

FIG. 10 is an example illustration of the system of FIG. 1, implemented using earbud devices 1002, 1004. As shown, each earbud device 1002, 1004 may include a gesture sensor 1006, 1008, respectively, and a calibration sensor 1010, 1012, also respectively.

Although illustrated as a pair, the earbud devices 1002, 1004 may be implemented singularly. Earbud devices 1002, 1004 may be suitable for detecting head-based gestures, such as nodding, tilting, or shaking, but detection of such gestures may be dependent upon a degree of tightness with which the earbud devices 1002, 1004 are worn within the ear(s) of the user 104.

Figure 11:
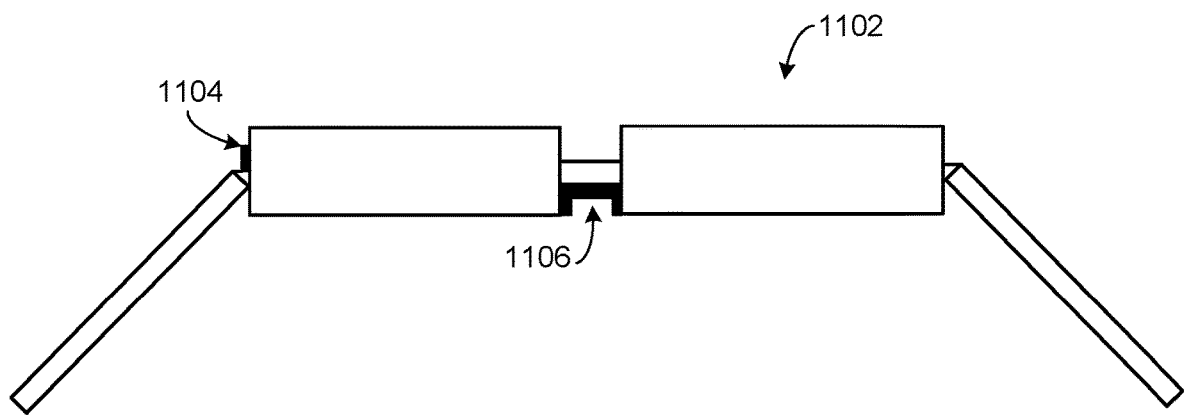
FIG. 11 is an example illustration of the system of FIG. 1, implemented using smartglasses.

FIG. 11 is an example illustration of the system of FIG. 1, implemented using smartglasses 1102. As shown, the smartglasses 1102 may include a gesture sensor 1104 and a calibration sensor 1106.

As with the earbud devices 1002, 1004 of FIG. 10, the smartglasses 1102 may detect, for example, various head gestures of the user 104, as well as gestures based on eye movements. FIG. 11 illustrates the gesture sensor 1104 positioned at a temple of the smartglasses 1102 and the calibration sensor 1106 positioned at a nose bridge of the smartglasses 1102. However, it will be appreciated that in various examples, and dependent upon a type of sensors being used, the sensors 1104, 1106 may be positioned at other locations with respect to the smartglasses 1102. For example, the gesture sensor 1104 and/or the calibration sensor 1106 may be positioned at either end of arms of the smartglasses 1102, or along a front face thereof.

Figure 12:
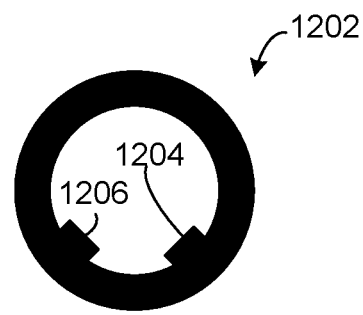
FIG. 12 is an example illustration of the system of FIG. 1, implemented using a ring.

FIG. 12 is an example illustration of the system of FIG. 1, implemented using a ring 1202. As shown, the ring 1202 may include a gesture sensor 1204 and a calibration sensor 1206.

Figure 13:
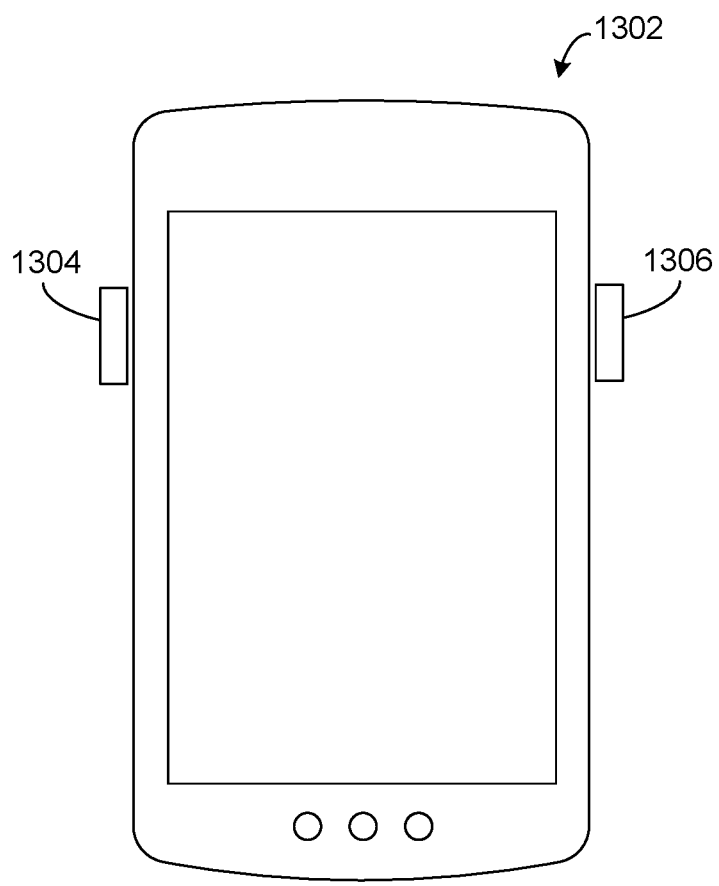
FIG. 13 is an example illustration of the system of FIG. 1, implemented using a smartphone.

FIG. 13 is an example illustration of the system of FIG. 1, implemented using a smartphone 1302. As shown, the smartphone 1302 may include a gesture sensor 1304 and a calibration sensor 1306.

As referenced above, the smartphone 1302 may be implemented for gesture detection while the smartphone 1302 is being held by the user 104. For example, the user 104 may be required to place a finger or palm on the gesture sensor 1304 and the calibration sensor 1306.

The calibration sensor 1306 may determine a degree of tightness with which the user 104 is holding the smartphone 1302. The degree of tightness may vary over a wider range and with a higher frequency in held scenarios than in worn scenarios, since the user 104 may incrementally change a pressure (e.g., squeeze) applied to the smartphone 1302 at any time. Consequently, the resulting calibration signals may be obtained more frequently than in other implementations, and calibration signal data may be buffered for less time.

In some implementations, different degrees of tightness/squeezing may be used as an additional gesture control function. For example, the same gesture may have a different effect depending on a concurrent level of tightness with which the user 104 is holding the smartphone 1302 while making each gesture.

Thus, described implementations provide many features, advantages, uses, and functionalities that would be difficult, impractical, infeasible, or impossible to achieve using conventional techniques for device control, including conventional gesture detectors. Moreover, users may be provided with abilities to control devices in convenient and intuitive manners.

For example, the various example implementations of FIGS. 9-13 may be used in combination with one another. For example, gestures detected by the smartwatch 902, the ring 1202, or the smartphone 1302 may be used to control operations of the smartglasses 1102, or of the earbuds 1002, 1004. Many other such combinations are also possible, including combinations using devices not specifically illustrated or described herein. Thus, it will be appreciated that the techniques described herein for gesture-based control may be used in virtually any device, including peripheral devices, wearable devices, and combinations thereof.

Figure 14:
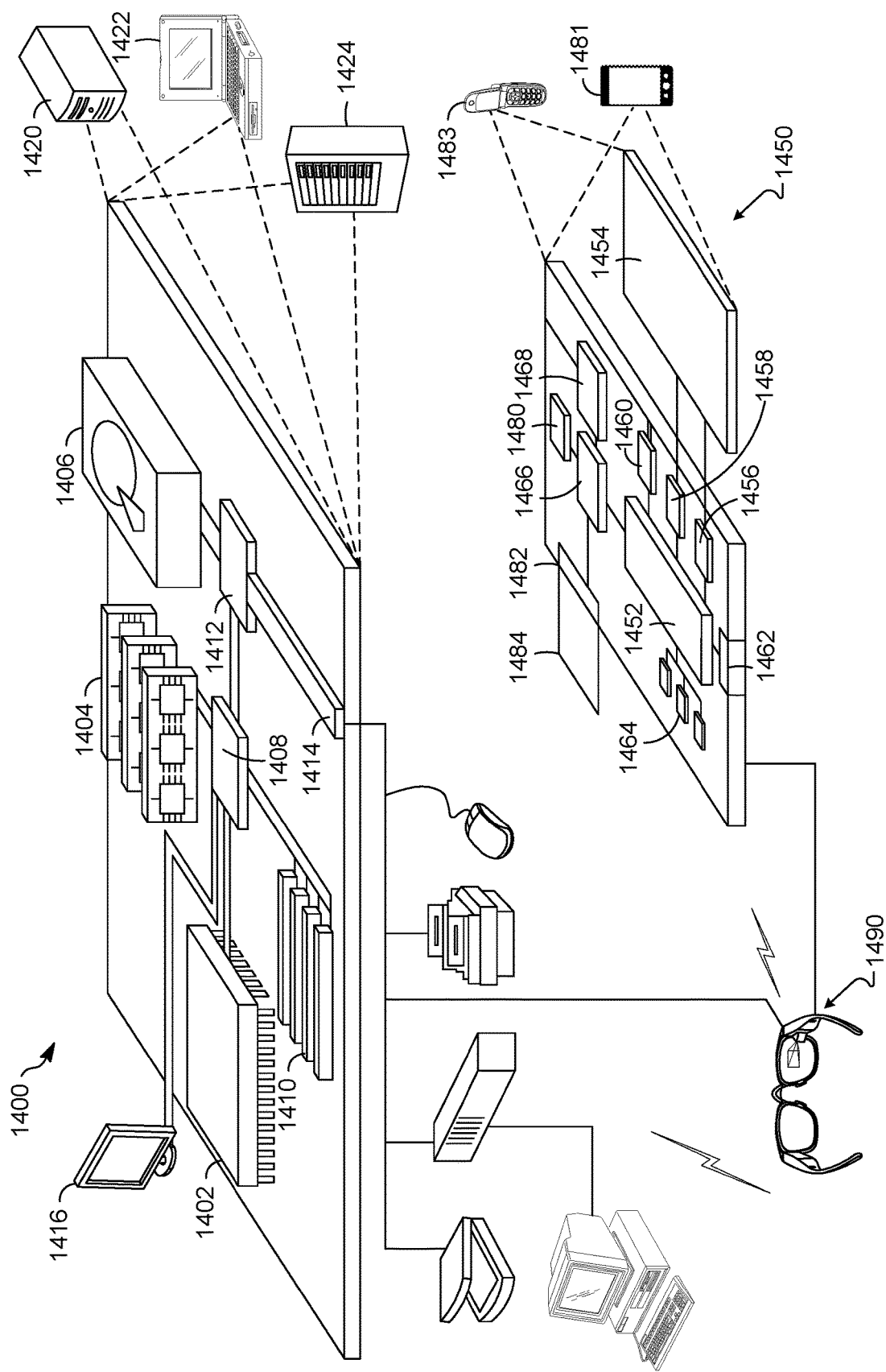
FIG. 14 shows an example of a computer device, mobile computer device and head mounted device according to at least one example implementation.

FIG. 14 shows an example of a computer device 1400 and a mobile computer device 1450, which may be used with the techniques described here. Computing device 1400 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk. In general, the computer-readable medium may be a non-transitory computer-readable medium.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1484 may also be provided and connected to device 1450 through expansion interface 1482, which may include, for example, a SIMM (Single In Line Memory Module) card interface. Such expansion memory 1484 may provide extra storage space for device 1450, or may also store applications or other information for device 1450. Specifically, expansion memory 1484 may include instructions to carry out or supplement the processes described above, and may include secure information also. Thus, for example, expansion memory 1484 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1484, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, low power Bluetooth, Wi-Fi, or other such transceiver (not shown). In addition, GPS (Global Positioning System) receiver module 1480 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1483. It may also be implemented as part of a smart phone 1481, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 14 can include sensors that interface with, or are included in, a HMD 1490. For example, one or more sensors included on computing device 1450 or other computing device depicted in FIG. 14, can provide input to HMD 1490 or in general, provide input to that can be used by the HMD 1490. The sensors can include, but are not limited to, a touchscreen, accelerometers, gyroscopes, pressure sensors, biometric sensors, temperature sensors, humidity sensors, and ambient light sensors. Computing device 1450 (e.g., the HMD 1490) can use the sensors to determine an absolute position and/or a detected rotation of the HMD 1490 that can then be used as input for use by the HMD 1490.

In some implementations, one or more input devices included on, or connected to, the computing device 1450 and/or the HMD 1490 can be used as inputs for use by the HMD 1490. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device.

In some implementations, one or more output devices included on the computing device 1450, and/or in the HMD 1490, can provide output and/or feedback to a user of the HMD 1490. The output and feedback can be visual, tactical, or audio. The output and/or feedback can include, but is not limited to, rendering a display of the HMD 1490, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 1450 can be placed within HMD 1490 to create an integrated HMD system. HMD 1490 can include one or more positioning elements that allow for the placement of computing device 1450, such as smart phone 1481, in the appropriate position within HMD 1490. In such implementations, the display of smart phone 1481 can render images using a display of the HMD 1490.

In some implementations, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the AR/VR space. As just one example, computing device can be a laser pointer. In such an example, computing device 1450 appears as a virtual laser pointer in the computer-generated, 3D environment. As the user manipulates computing device 1450, the user in the AR/VR space sees movement of the laser pointer. The user receives feedback from interactions with the computing device 1450 in the AR/VR environment on the computing device 1450 or on the HMD 1490.

In some implementations, a computing device 1450 may include a touchscreen. For example, a user can interact with the touchscreen in a particular manner that can mimic what happens on the touchscreen with what happens in a display of the HMD 1490. For example, a user may use a pinching-type motion to zoom content displayed on the touchscreen. This pinching-type motion on the touchscreen can cause information provided in display to be zoomed. In another example, the computing device may be rendered as a virtual book in a computer-generated, 3D environment.

In some implementations, one or more input devices in addition to the computing device (e.g., a mouse, a keyboard) can be rendered in a display of the HMD 1490. The rendered input devices (e.g., the rendered mouse, the rendered keyboard) can be used as rendered in the in the display.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer program product, the computer program product being tangibly embodied on a non-transitory computer-readable storage medium and comprising instructions that, when executed by a computing device, are configured to cause the at least one computing device to:
   receive a gesture signal generated by a gesture sensor in response to a gesture of a user performed while the at least one computing device is being worn or held by the user, the gesture sensor being coupled to the at least one computing device;
   receive a calibration signal generated by a calibration sensor coupled to the at least one computing device, the calibration signal characterizing a degree of tightness with which the at least one computing device is being worn or held by the user;
   calibrate the gesture signal using the calibration signal, to obtain a calibrated gesture signal that is calibrated with respect to the degree of tightness; and
   implement at least one function of the at least one computing device, based on the calibrated gesture signal.

2. The computer program product of claim 1, wherein the instructions, when executed, are further configured to cause the at least one computing device to:
   convert the gesture signal from any of a plurality of types of gesture sensors to a continuous gesture score; and
   calibrate the gesture signal using the continuous gesture score.

3. The computer program product of claim 1, wherein the gesture sensor includes an inertial measurement unit (IMU).

4. The computer program product of claim 1, wherein the instructions, when executed, are further configured to cause the at least one computing device to:
   determine the calibration signal from a heartrate signal of the user measured by the calibration sensor.

5. The computer program product of claim 1, wherein the calibration sensor includes a photoplethysmography (PPG) sensor.

6. The computer program product of claim 1, wherein the instructions, when executed, are further configured to cause the at least one computing device to:
   calibrate the gesture signal using the calibration signal including providing the calibration signal and the gesture signal to a neural network trained using training data that includes ground truth gesture signals, calibration signals, and degrees of tightness.

7. The computer program product of claim 1, wherein the instructions, when executed, are further configured to cause the at least one computing device to:
   buffer the calibration signal over a defined time period to obtain buffered calibration signal data;
   convert the buffered calibration signal data to a spectral feature; and
   calibrate the gesture signal using the spectral feature.

8. The computer program product of claim 1, wherein the instructions, when executed, are further configured to cause the at least one computing device to:
   capture and store the calibration signal at a defined frequency;
   calibrate the gesture signal using a most-recently stored calibration signal.

9. The computer program product of claim 1, wherein the at least one computing device includes at least a first computing device and a second computing device, and further wherein the gesture sensor and the calibration sensor are coupled to the first computing device, and implementing the at least one function includes transmitting a command from the first computing device to instruct the second computing device to perform at least a second function.

10. The computer program product of claim 9, wherein the first computing device includes a watch, and the second computing device includes a pair of smartglasses.

11. A computer-implemented method, the method comprising:
   receiving a gesture signal generated by a gesture sensor in response to a gesture of a user performed while at least one computing device is being worn or held by the user, the gesture sensor being coupled to the at least one computing device;
   receiving a calibration signal generated by a calibration sensor coupled to the at least one computing device, the calibration signal characterizing a degree of tightness with which the computing device is being worn or held by the user;
   calibrating the gesture signal using the calibration signal, to obtain a calibrated gesture signal that is calibrated with respect to the degree of tightness; and
   implementing at least one function of the at least one computing device, based on the calibrated gesture signal.

12. The method of claim 11, further comprising:
   converting the gesture signal from any of a plurality of types of gesture sensors to a continuous gesture score; and
   calibrating the gesture signal using the continuous gesture score.

13. The method of claim 11, wherein receiving the calibration signal comprises:
   determining the calibration signal from a heartrate signal of the user measured by the calibration sensor.

14. The method of claim 11, wherein calibrating the gesture signal includes:
   providing the calibration signal and the gesture signal to a neural network trained using training data that includes ground truth gesture signals, calibration signals, and degrees of tightness.

15. The method of claim 11, further comprising:
   buffering the calibration signal over a defined time period to obtain buffered calibration signal data;
   converting the buffered calibration signal data to a spectral feature; and
   calibrating the gesture signal using the spectral feature.

16. The method of claim 11, wherein the at least one computing device includes at least a first computing device and a second computing device, and further wherein the gesture sensor and the calibration sensor are coupled to the first computing device, and implementing the at least one function comprises:
   transmitting a command from the first computing device to instruct the second computing device to perform at least a second function.

17. A computing device comprising:
   a processor;
   a storage medium storing instructions;
   a body;
   a gesture sensor coupled to the body and configured to generate a gesture signal generated in response to a gesture of a user performed while the computing device is being worn or held by the user; and
   a calibration sensor coupled to the body and configured to generate a calibration signal characterizing a degree of tightness with which the computing device is being worn or held by the user;

wherein the instructions, when executed by the processor, cause the computing device to
calibrate the gesture signal using the calibration signal, to obtain a calibrated gesture signal that is calibrated with respect to the degree of tightness, and
implement at least one function of the at least one computing device, based on the calibrated gesture signal.

18. The computing device of claim 17, wherein the instructions, when executed by the processor, cause the computing device to:
determine the calibration signal from a heartrate signal of the user measured by the calibration sensor.

19. The computing device of claim 17, wherein the instructions, when executed by the processor, cause the computing device to
calibrate the gesture signal including providing the calibration signal and the gesture signal to a neural network trained using training data that includes ground truth gesture signals, calibration signals, and degrees of tightness.

20. The computing device of claim 17, wherein the computing device includes at least one or more of a smartwatch, a ring, an earbud, smartglasses, or a smartphone.

* * * * *